United States Patent [19]

Takayama et al.

[11] 4,225,888
[45] Sep. 30, 1980

[54] HIGH EFFICIENCY FACSIMILE TRANSMISSION SYSTEM

[75] Inventors: Shoichiro Takayama; Norio Nakagata; Takeharu Katsuno, all of Tokyo, Japan

[73] Assignee: Oki Electric Industry Co., Ltd., Tokyo, Japan

[21] Appl. No.: 924,075

[22] Filed: Jul. 12, 1978

[30] Foreign Application Priority Data

Dec. 20, 1977 [JP] Japan .................................. 52/152335

[51] Int. Cl.² .......................... H04N 1/17; H04N 7/12
[52] U.S. Cl. ........................................ 358/288; 358/260
[58] Field of Search ............... 358/288, 260, 261, 262, 358/263

[56] References Cited
U.S. PATENT DOCUMENTS

| 2,922,840 | 1/1960 | Lally | 358/260 |
| 4,044,382 | 8/1977 | Yagishita | 358/260 |
| 4,047,228 | 9/1977 | Yagishita et al. | 358/261 |

FOREIGN PATENT DOCUMENTS 2747020  5/1978  Fed. Rep. of Germany ........... 358/260

Primary Examiner—Robert L. Griffin
Assistant Examiner—Joseph A. Orsino, Jr.
Attorney, Agent, or Firm—Armstrong, Nikaido, Marmelstein & Kubovcik

[57] ABSTRACT

The present facsimile transmission system is a combination of the prior Skipping White Space (SWS) system which is a digital system capable of rapid transmission, and the prior AM-PM-VSB (Amplitude Modulation, Phase Modulation, Vestigial Side Band Modulation), which is a simple analog system. Each scanning line of a picture is divided into a plurality of blocks each of which has a plurality of picture cells, and only those blocks having a black cell are transmitted as a picture signal. On the other hand the block having no black cell is not transmitted, and instead, the flag information indicating that the block is omitted is transmitted. Also a line synchronization signal is transmitted for each scanning line. When said signals (picture signals, flag information and a line synchronization signal) are modulated into an AM-PM-VSB signal, a picture signal is modulated as an ordinary analog signal, and a flag information and a line synchronization signal has the twice level as high as the highest level of the picture information, and have the duration longer than that of each picture cell. Thus, although a simple analog AM-PM-VSB system is utilized, the important information like a line synchronization signal and a flag information which affect much to the received picture quality are transmitted with a small error rate and a high reliability.

6 Claims, 13 Drawing Figures

Fig. 10

| WITH/WITHOUT IDENTIFICATION SIGNAL 207A | DOUBLE LEVEL IDENTIFICATION SIGNAL 207B | POLARITY IDENTIFICATION SIGNAL 207C | IDENTIFIED CONDITION |
|---|---|---|---|
| H | H | H | $P_2$ |
| H | L | H | $P_1$ |
| L | L | H or L | Z |
| H | L | L | $M_1$ |
| H | H | L | $M_2$ |

Fig. 12

| NUMBERS OF CONSECUTIVE SKIPPING BLOCKS | CODE COMPOSITION OF BYTE SIGNALS | | | | |
|---|---|---|---|---|---|
| | B1 | B2 | B3 | B4 | B5 |
| 1 | I | | | | |
| 2 | R | | | | |
| 3 | I | I | | | |
| 4 | I | R | | | |
| 5 | R | I | | | |
| 6 | R | R | | | |
| 7 | I | I | R | | |
| 8 | I | R | I | | |
| 9 | I | R | R | | |
| 10 | R | I | I | | |
| 11 | R | I | R | | |
| 12 | R | R | I | | |
| 13 | I | I | R | I | |
| 14 | I | I | R | R | |
| 15 | I | R | I | I | |
| 16 | I | R | I | R | |
| 17 | I | R | R | I | |
| 18 | R | I | I | R | |
| 19 | R | I | R | I | |
| 20 | R | I | R | R | |
| 21 | R | R | I | I | |
| 22 | R | R | I | R | |
| 23 | I | I | R | I | I |
| 24 | I | I | R | I | R |
| 25 | I | I | R | R | I |
| 26 | I | R | I | I | R |
| 27 | I | R | I | R | I |
| 28 | I | R | I | R | R |
| 29 | I | R | R | I | I |
| 30 | I | R | R | I | R |
| 31 | R | I | I | R | I |
| 32 | R | I | I | R | R |
| 33 | R | I | R | I | I |
| 34 | R | I | R | I | R |

HIGH EFFICIENCY FACSIMILE TRANSMISSION SYSTEM

BACKGROUND OF THE INVENTION

The present invention relates to a facsimile system by which highly efficient transmission can be accomplished through reduction of redundancy, during transmission of picture signals, where binary information containing redundancy is handled.

The conventional highly efficient facsimile transmission systems are the following two:

(a) A code conversion redundancy reduction system for the reduction of redundancy inherent to the document/picture, which are the information sources; and (b) A highly efficient modulation/demodulation method for the purpose of minimizing the transmission channel redundancy which does not effectively utilize the transmission frequency bandwidth.

As a modulation/demodulation method for voice channel telephone circuit used for the transmission of document/picture, AM-DSB (Amplitude Modulation-Double Side Band) or FM (Frequency Modulation) is designated for the Group 1 model (6 minute machine) of CCITT; AM-PM-VSB (Amplitude Modulation-Phase Modulation-Vestigial Side Band) is designated for the Group 2 model (3 minute machine) of CCITT. For the Group 3 model of CCITT (1 minute machine), V26 bis (2400 bits/sec) or V27 ter (4800 bits/sec) are recommended by CCITT. The recommendations by CCITT are published by ITU (International Telecommunication Union) located in Geneva in Switzerland, and ITU is one of the subsidiary organizations of the United Nations. Thus, the use of PM (Phase Modulation) is being encouraged. On the other hand, with respect to the redundancy reduction method, various propositions are being made for the attainment of high speed (about one minute) transmission of A4 size (appoximate 21 cm×29.5 cm).

For any model higher than the Group 3 model of CCITT (1 minute machine), one of these technologies is likely to be adopted. These provisions focus on the run length of the same picture element within a single main scanning line, and a method of having this run length match with the Wyle's code or having the run length match with the modified Huffman code, or any other one dimensional run length encoding methods, has been proposed. Further, various inventions relating to two dimensional encoding method have been announced.

Among the prior arts mentioned above, the AM-PM-VSB (Amplitude Modulation—Phase Modulation—Vestigial Side Band Modulation) modulation system and the skipping white space (SWS) redundancy reduction system, which are closely related to the present invention of highly efficient facsimile transmission system, are briefly explained below.

The AM-PM modulation system is shown in "CCITT" period 1977-1980 study group XIV-contribution No. 2, by Nippon Telephone and Telegraph Public Corporation), and is summarized below.

FIG. 1 is a schematic block diagram of a facsimile transmitter incorporating multilevel AM-PM modulation system which is a prior art. FIG. 2 is waveforms prepared to explain this modulation method. In FIG. 1, the picture element information of a whole line has been scanned. Black picture element having "0" level, and white picture element having "1" level are supposed to have been stored into the shift register 1 through the input line 100. The serial binary picture signals 102 read out by the timing signal 101 are applied to the polarity inversion circuit 3 and to the flipflop 2. The flipflop 2, at the changing point from the "1" level of the input signal 102 to the "0" level, inverts the status of the output 103 from L to H or from H to L (see FIG. 2). When the signal 103 is L level, the polarity inversion circuit 3 provides the output 104 which is the same as the input 102. When the signal 103 is H level, it provides the polarity inverted output of the input 102 to the output line 104. Therefore, as can be observed in the waveform diagram of FIG. 2, the signal 104 becomes ternary waveform comprising +1 level, 0 level, and −1 level. Further, the signal 104 receives a level shift of +1 level at the addition circuit 5 and gains the ternary output 105 comprising +2 level, +1 level, and 0 level.

On the other hand, the aforementioned signal 103 is also applied to the input of the flipflop 4. Therefore, at the changing point from H to L of the input signal 103, the flipflop 4 causes the status of output line 106 to invert from L to H or from H to L. By the input signals 105 and 106 thus created, the polarity inversion circuit 6 behaves in the same way as the inversion circuit 3 and provides the quinary baseband signal comprising +2 level, +1 level, 0 level, −1 and −2 level as illustrated in FIG. 2. At the amplitude modulation circuit 8, the output 108 of the carrier wave generation circuit 7 undergoes amplitude modulation by the aforementioned baseband signal 107, and provides quinary AM-PM modulation signal 109A as illustrated in FIG. 2. The AM-PM-VSB modulation wave for general practical use can be obtained by passing the quinary AM-PM modulation signal 109A through the VSB circuit.

The above describes the quinary AM-PM-VSB modulation operation. If the circuit 9 surrounded by the dotted line in FIG. 1 is excluded, the amplitude modulation circuit input is given to the signal 104 instead of the signal 107. In this case, the ternary AM-PM modulation signal 109B illustrated in FIG. 2 can be obtained for the output of the amplitude modulation circuit 8. Further, by passing through the VSB circuit, the ternary AM-PM-VSB modulated waves can be transmitted to the channel. As mentioned above, through use of the multi-level AM-PM-VSB modulation system, a highly efficient document/picture transmission, effectively utilizing a given frequency bandwidth, becomes possible.

However, it is evident that the above described multi-level AM-PM-VSB modulation system has yet to be improved in that the redundancy areas and the significant information areas in the picture are handled equally.

Following is a brief description of another prior art, skipping white space system (SWS) with reference made to FIG. 3 and FIG. 4. Concerning a prior SWS system, there are many documents, some of which are U.S. Pat. No. 4,044,382, and U.S. Pat. No. 4,047,228. FIG. 3 illustrates a schematic block diagram of the facsimile transmitter employing SWS system. FIG. 4 illustrates waveforms which explain the conventional SWS system. FIG. 4 provides an example where the number of constituent picture elements in one line counts 1728 which are divided into 108 blocks of 16 picture elements each. It is supposed that one scanning line of picture information has already been scanned. The black picture element "0" is made to match with the white picture element "1" and has been stored in the picture signal memory 20 through the input line 120. At the same time, with respect to the blocks, each of which has 16 picture elements there blocks without black picture elements are designated as flag "0". These flags 1 or 0 are given sequentially by the identification circuit 21. The results are supposed to be stored into the flag memory 22. The control circuit 23 reads out the flag for the first block from the flag memory 22 and, by finding that this flag is "1", identifies that this block has no block cell. In this case the control circuit 23 provides only flag "1" to the input 123 of the modulation circuit 24, but does not provide the content of the block. The same is repeated with respect to the second block. With respect to the third block (#3), the flag being "0", it is identified to be with black. In this case the flag "0" of the third block and the signal "1110000011100111" indicating the status of the 16 picture elements comprising the block (See FIG. 4) shall be an input of the modulation circuit 24 as a serial signal. The same processes continue until the 108 blocks have been transmitted and processing of 1 scanning line has been completed.

In this manner, in the conventional SWS system, the flag "1" that matches with the block without black cell has a role of block skipping flag. This substantially reduces transmission time. But, on the other hand, compared with the case where redundancy reduction were not done, the deterioration of the quality of reproduced picture would have been aggravated arising from transmission errors of the flags.

Further, in such a combination of AM-PM-VSB modulation system and the SWS redundancy reduction system, bit by bit performance is not necessarily satisfactory because of possible transmission errors, since characteristics of AM-PM-VSB modulation system lies in simplicity of its arrangement. In particular, it should be noted that the AM-PM-VSB modulation system is originally an analog modulation system and is not suitable to transmit a digital signal like a skipping flag. Therefore, a prior AM-PM-VSB system can not transmit a flag information (which is a digital signal) in SWS system, since a flag information is SWS system plays a major role and a single error of a flag information affects much to the deterioration of the picture quality.

SUMMARY OF THE INVENTION

It is an object, therefore, of the present invention to overcome the disadvantages and limitations of prior facsimile transmission system by providing a new and improved facsimile transmission system.

Another object of the present invention is to provide a facsimile transmission system which is a combination of a simple AM-PM-VSB system which is an analog system, and a Skipping White Space (SWS) system which is a digital system and is capable of transmitting a picture information with high efficiency.

According to the present invention, each scanning line is divided into a plurality of blocks each of which has a plurality of picture cells, and only those blocks having a black cell are transmitted as a picture signal. The block having no black cell is not transmitted, and instead, the flag information indicating that the block is omitted is transmitted. Also a line synchronization signal is transmitted for each scanning line. When said signals (picture signals, flag information and line synchronization signal) are modulated into AM-PM-VSB signal, a picture signal is modulated as an ordinary analog signal, and a flag information and a line synchronization signal has the twice level as high as the highest level of the picture information, and have the duration longer than that of each picture cell. Thus, although a simple analog AM-PM-VSB system is utilized, the important information like a line synchronization signal and a flag information which affect much to the received picture quality are transmitted with a high reliability.

According to the preferable embodiment of the present invention, when there are more than two continuous blocks which have no black cell, the phase of the flag signal is changed for each blocks.

Further, when there are more than two continuous blocks which have no black cell, the number of those blocks is encoded, and the flag signal transmits only that code.

Preferably, each scanning line has 1728 picture cells, and is divided into 108 blocks. Thus, each block has 16 picture cells (1728/108=16).

BRIEF DESCRIPTION OF THE DRAWINGS

The foregoing and other objects, features, and attendant advantages of the present invention will be appreciated as the same become better understood by means of the following description and accompanying drawings wherein;

FIG. 10 is a diagram illustrating the relationship between the signal 207 for explanation of the operation of the receiver in FIGS. 8 and 9 and the classified status.

FIG. 12 indicates relationships between the numbers of consecutive skipping blocks and the byte signal code composition in the second embodiment of the present invention.

DESCRIPTION OF THE PREFERRED EMBODIMENTS

Figure 5:
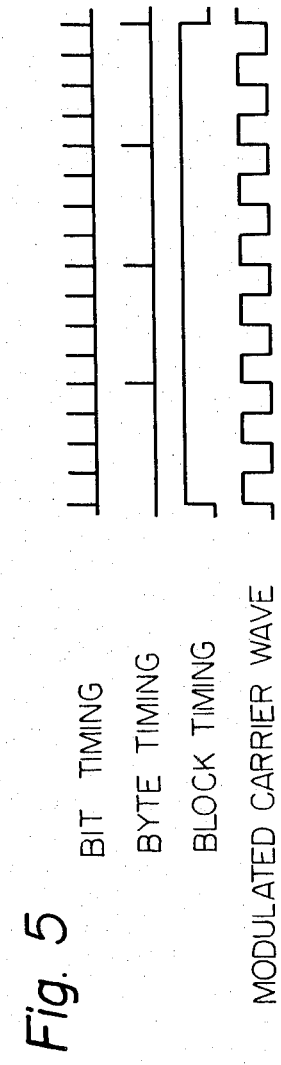
FIG. 5 is a waveform diagram prepared for explaining the first embodiment of the present invention.

First, the operational principle of the present invention is summarized for the easy understanding of the present invention. In the explanation hereinafter, unless otherwise specified, for convenience of explanation, it is understood that 1 scanning line is composed of 1728 picture elements or 108 blocks of 16 picture elements. Further, in order to define time unit of modulator circuit input signal, 3 different types of timing, bit timing, byte timing and block timing, are defined. Bit timing is defined as a timing for a period of 1 picture element (or cell) transmission unit length, provided redundancy reduction is not effected. Byte timing is defined as a timing for a period of integer multiple (n) of bit timing. Block timing is defined as a timing for a period of an integer multiple (m) of bit timing. Provided that $m > n$ is understood. FIG. 5 shows a waveform diagram of the 3 different types of timings in which $n=4$ and $m=16$. FIG. 5 also provides a waveform of modulated carrier wave. In the following explanation, unless otherwise specified, $N=4$ and $M=16$.

At the same time, if block picture elements are contained in the blocks to be transmitted, all the picture element information signals of the block are, making base band signals by bit timing, modulated and transmitted intact. In this process, black picture element is made to match "0" level and white picture element $+1$ level or $-1$ level. To determine the polarity for the white picture element, it shall be defined that:

If immediately preceded by a black picture element the polarity shall be inverse to the polarity of the last white picture element preceding that black picture element;

if immediately preceded by a white picture element the polarity shall be the same as the polarity of that preceding white picture element.

The present invention is not limited to the definition related to the above noted polarity. But, for the sake of convenience of explanation, and above definition is to be used.

Now, when the block to be transmitted has no black picture element, picture element information signal is not transmitted. Instead, by means of byte timing, base band signals are made, and skipping flag is modulated and transmitted. At this time, the skipping flag is made to match $+2$ level or $-2$ level. In a situation where the blocks without black continue, skipping flags are continuously transmitted whose numbers are equal to the uninterrupted number of the skipping blocks but the polarity is inverted at every edge of the byte timing.

In the following explanation, the signal which transmits the condition of the picture elements intact by bit timing is to be called "picture element information signal". And, the double level signal that does not change the condition on each unit of byte timing such as the "skipping flag" for the "block without black" is to be called "byte signal". Also, the signals that represent details of picture such as mentioned above, i.e., "picture element information signal" and "skipping flag", are to be generalized as "document/picture signals". These are made distinct from the "line synchronizing signals" used for sub-scan control.

FIGS. 6-9 are prepared to illustrate the first embodiment of the present invention as referred to above.

Figure 6:
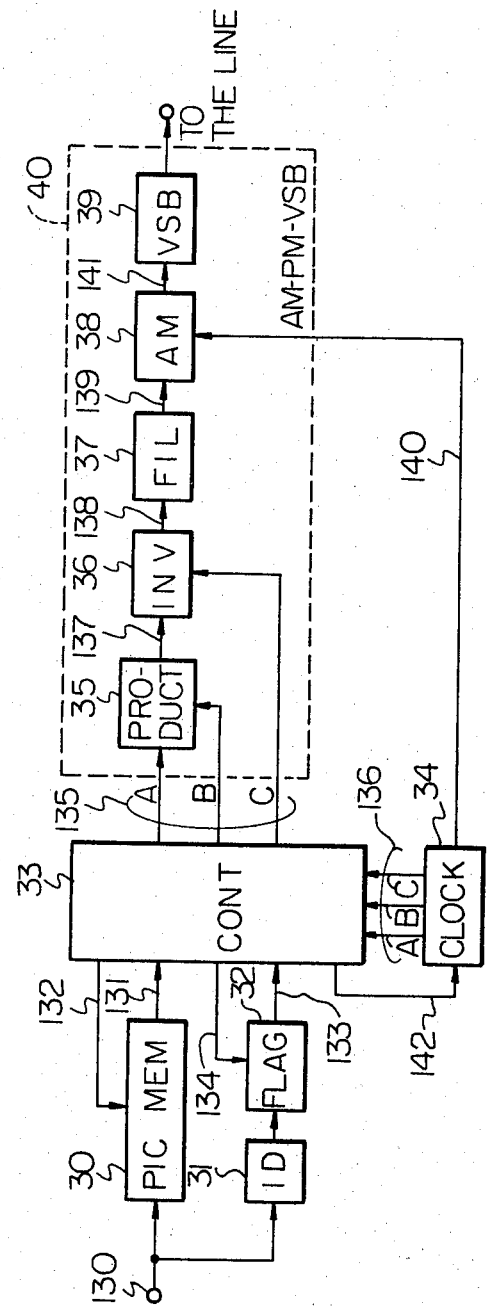
FIG. 6 is a schematic block diagram of the facsimile transmitter of the first embodiment of the present invention.
Figure 7:
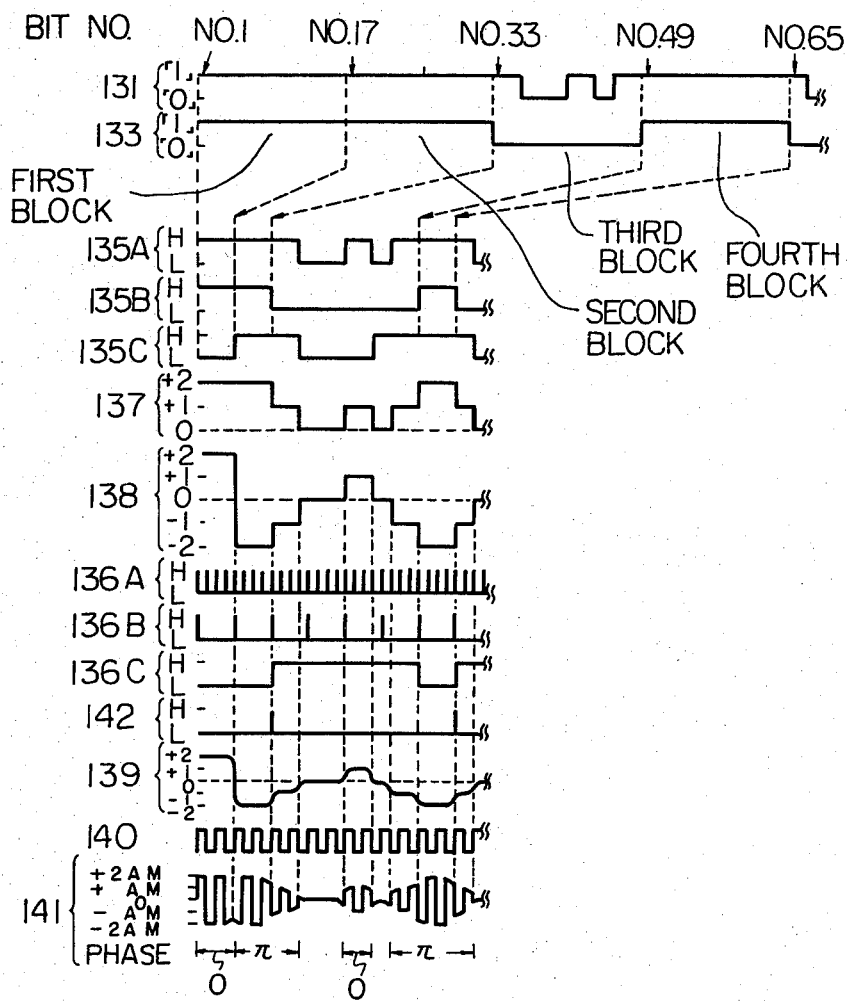
FIG. 7 is a waveform diagram prepared for explaining operation of the transmitter of the first embodiment of the present invention.

FIG. 6 illustrates a schematic block diagram of the facsimile transmitter. FIG. 7 shows a waveform prepared for explanation of its performance.

In FIG. 6, it is supposed that a whole screen has already been scanned and the picture information of a whole screen is stored in a MOS shaft register or CCD element (Charge Coupled Device), (not shown), and the output of that MOS shift register or CCD is provided on an input line 130. The black picture element "0" and white picture element "1" of a whole screen are stored in the picture signal memory 30 via the input line 130. At the same time, for the 108 blocks, sections of 16 picture elements that constitute one line of 1728 picture elements, the result of sequential identification of each block without black and each block with black identified through the identifying circuit to be Flag "1" and Flag "0" respectively is to be stored in the flag memory 32. That is to say, the flag memory 32 stores the information if each block has a black element or not. Bit number read-out command signals 132 are applied from the control circuit 33 to the picture signal memory 30. These signals designate bit numbers 1 through 1728. Each line starts with the bit No. 1. The block flag read out command signals 134 are also applied to the flag memory 32 from the control circuit 33. These designate the block numbers from No. 1 block through No. 108 block. Each line starts with the No. 1 block.

Main operation of the control circuit 33 is to have the "block flag read out command signal 134" read out the flag signal onto the signal line 133 and under this condition to selectively supply either the signal line 131 or the signal line 133 to the input signal line 135 of the AM-PM-VSB modulation circuit 40. The signal line 135A is the signal for controlling On or OFF of the carrier wave. Under condition of the level H, carrier wave is transmitted and under condition of the level L, carrier wave is not transmitted. The signal line 135B is the signal which controls amplitude at the time of transmission of carrier wave. The carrier wave amplitude under condition of the level H is double of that under condition of the level L. The signal line 135C is a signal which controls the phase at the time of transmitting the carrier wave. Under condition of the level H, it is $\pi$ phased or polarity inverted and under condition of the level L, it is 0 phased or the normal polarity.

The product circuit 35 gains ternary signals 137 viz. $+2$ level, $+1$ level and 0 level from the signal 135A and 135B. The polarity inversion circuit 36 gains quinary signals 138 comprising $+2$ level $+1$ level, 0 level, $-1$ level and $-2$ level from the signal 137 and the signal 135C. The signal 138 is provided with a wideband frequency spectrum. If amplitude modulation is directly done, a foldover distortion will be generated. Therefore, the baseband signal 139 with the high frequency component eliminated is to be gained through the base band filter 37 beforehand. The base band signal 139 conducts, at the amplitude modulation circuit 38, amplitude modulation of the carrier wave signal 140 and produces the AM-PM modulation wave 141, which is then passed through the VSB (Vestigial Side Band) circuit 39, so that the AM-PM-VSB modulation wave can be transmitted to the line. The clock circuit 34 is a circuit that divides the original clock pulse of high frequency, and provides bit timing 136A, byte timing 136B, block timing 136C and the carrier wave signal 140. The block timing 136C is a signal which is triggered by the signal 142 from the control circuit 33 and is turned to the level H for a period of 16 bits. In the meantime, it leads the signal on the signal line 131 to the signal line 135 as the picture element information signal. The signal line 135C is established so that its condition will change from H level to L level or from L level to H level, at the changing point from the level H to the level L of the signal line 135A, or at the skipping flag C edge which is the significant point of the byte timing 136B in a situation where more than two continuous skipping flags are generated.

Figure 1:
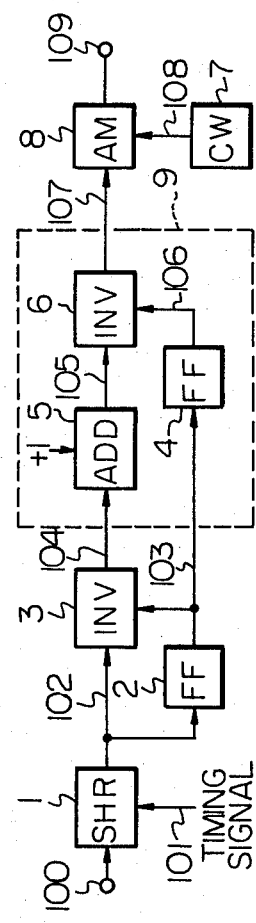
FIG. 1 is a schematic block diagram of the facsimile transmitter incorporating the prior art of multilevel AM-PM modulation system.
Figure 3:
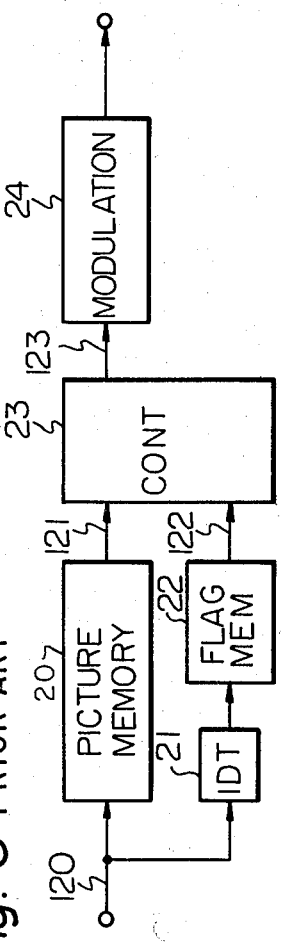
FIG. 3 is a schematic block diagram of the facsimile transmitter incorporating the prior art of SWS system.
Figure 2:
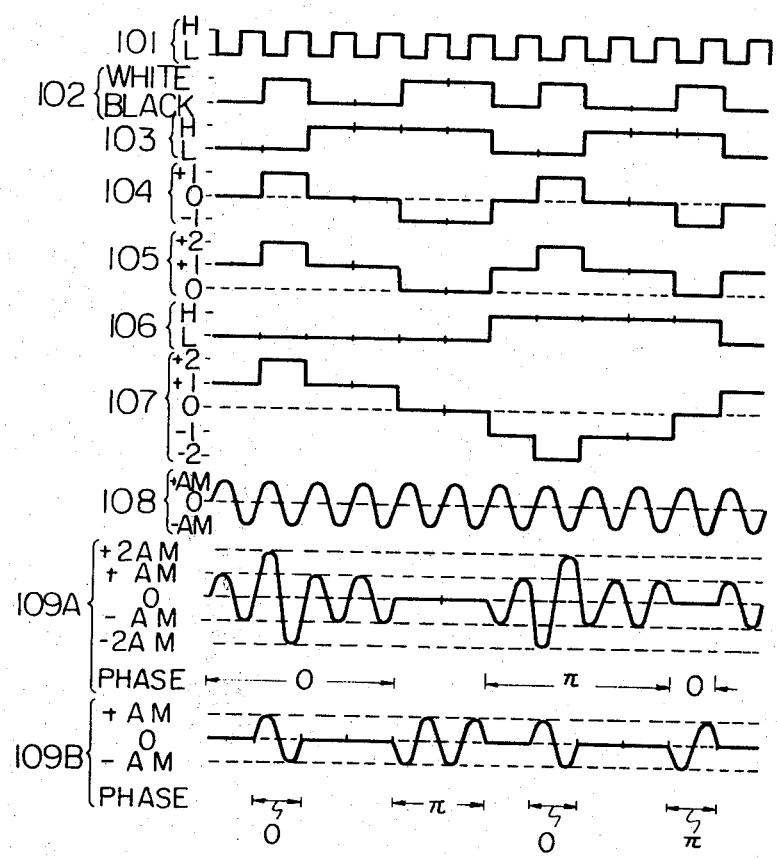
FIG. 2 is a waveform diagram prepared for explaining the above modulation system.
Figure 4:
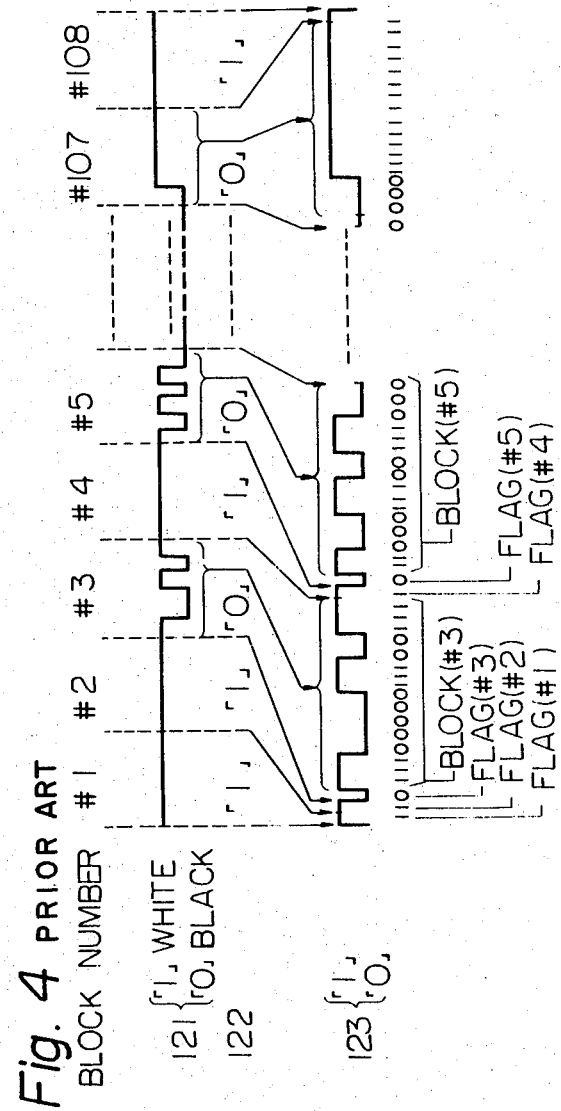
FIG. 4 is a waveform diagram prepared for explaining the SWS system.

Following is an explanation of the waveform illustrated in FIG. 7. Initially, by the block flag read out command signal 134, the control circuit 33 reads out the flag that matches with the first block of the flag memory to the signal line 133. If "1", as shown in FIG. 7, the read-out of the picture signal memory is eliminated, the bit number is advanced forward by 16 bits, and in order to transmit skipping flags both the signal line 135A and 135B be put under condition H, and put the condition of the signal line 135C under the same condition as immediately before (condition L in the diagram). Then, the signal 137 becomes +2 level and the signal 138 becomes +2 level. Thus, a carrier wave with an amplitude of 2·AM with the normal phase as signal 140 can be obtained. Under this condition, when the bit timing 136A proceeds 4 bits, the byte timing 136B is generated. At this point, the flag for the second block is read out. The flag of the second block being also "1" as shown in FIG. 2, the bit members are made to further advance by 16 bits, the signal lines 135A and 135B are turned to condition H, and the signal line 135C is caused to change from condition L to H. By this change, the signal 137 becomes +2 level and the signal 138 −2 level, and a carrier wave of amplitude 2·AM with the phase inverse to the signal 140 can be obtained.

As the bit timing 136A proceeds 4 bits under the above condition, the byte timing 136B is generated and reads out the flag for the third block. Since the flag for the third block is "0" in FIG. 7 (see 133), the signal 142 turns the block timing 136C to condition H. The block timing 136C maintains the condition H for the 16 bit period, and then, in the absence of the signal 142, it automatically returns to the condition L. While the block timing 136C is under condition H, the control circuit 33 advances the bit numbers bit by bit and at the same time reads out the picture element information in the third block to the signal line 131. It is supposed in FIG. 7, that contents of the bit No. 33 through 48 being "1110000011100111", the condition of the signal line 135A becomes "HHHLLLLLHHHLLHHH", while the signal line 135B turns to condition L during the 16 bit period and the signal line 135C responds to the signal line 135A to become "HHHLLLLLLLLHHHHH". The signal line 135C changes from L to H or from H to L only when signal line 135A changes from H to L. Signal line 135C does not change when signal line 135A changes from L to H. Therefore, the signal 138 changes in the following order: −1 level for 3 bits, 0 level for 5 bits, +1 level for 3 bits, 0 level for 2 bits, and −1 level for 3 bits. However, the carrier wave transmitted to the line is of inverse phase for the amplitude AM (3 bits), amplitude 0 (5 bits), and of the same phase for the amplitude AM (3 bits), amplitude 0 (2 bits) and again of opposite phase for the amplitude AM (3 bits).

When transmission of the 16 bit picture element information signals of the third block has been completed, the bit number is advanced to the first bit of the fourth block, i.e., No. 49, and the flag for the fourth block is read out. Since the flag for the fourth block is "1" (see 133 in FIG. 7), the bit number is further advanced forward by 16 bits. The signal lines 135A and 135B are turned to condition H, and the condition of the signal line 135C is left under condition H, the same condition as the final condition of the third block. Through this process, the skipping flag of the fourth block becomes the same condition as the second block, and a carrier wave of amplitude 2·AM (4 bits) with inverse phase is obtained. Similar operations are repeated hereafter, and the rest of the blocks are processed, thus completing transmission of one line of document/picture signals.

Every function of the control circuit 33 can of course be arranged by means of a hardware. But if a circuit incorporating a microprocessor with typical basic functions is used, it is obvious that the arrangement can be readily done by providing the system with the above described functions as a firm aware which is a hardware with a fixed program.

Figure 8:
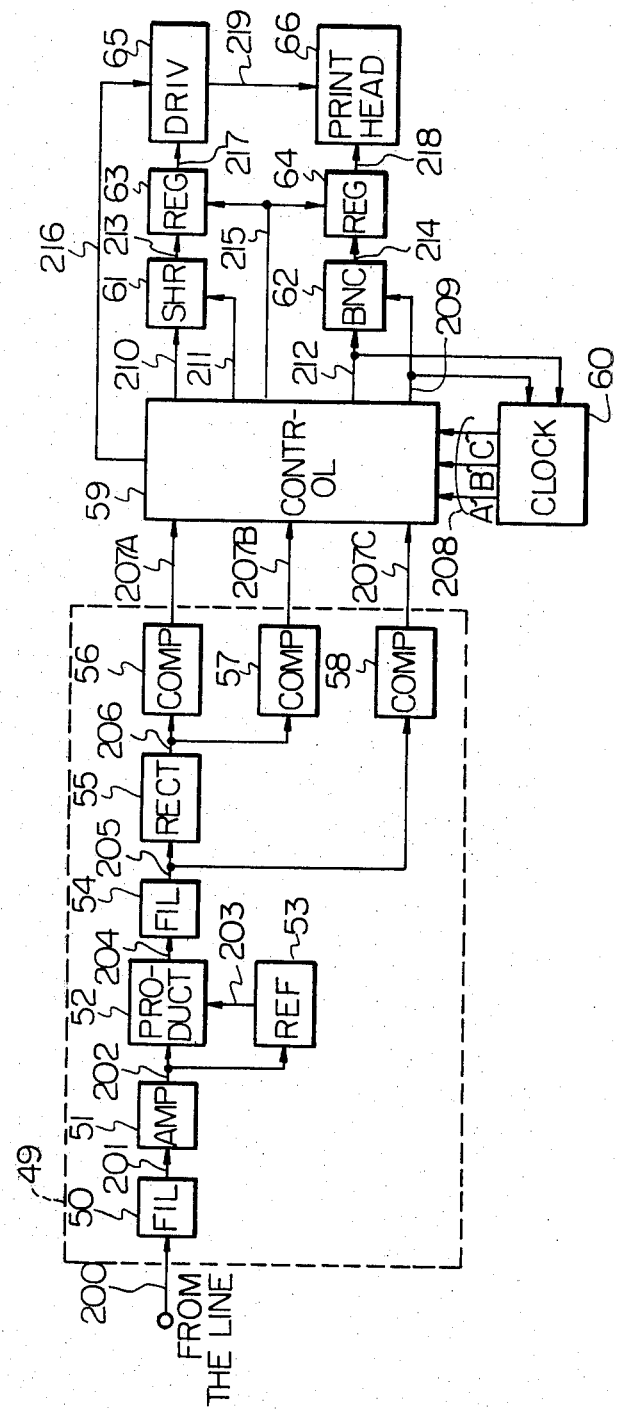
FIG. 8 is a schematic block diagram of the facsimile receiver of the first embodiment of the present invention.
Figure 9:
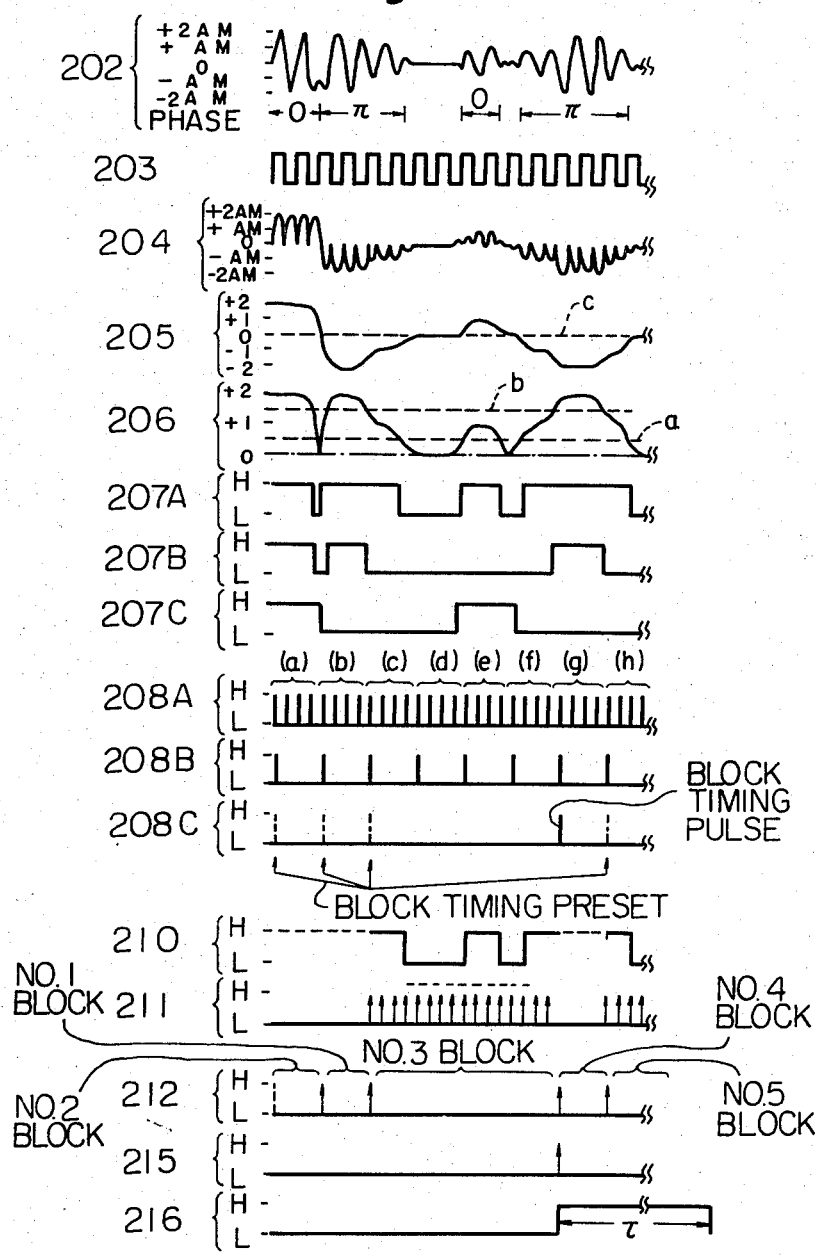
FIG. 9 is a waveform diagram prepared for explaining operation of the receiver of the first embodiment of the present invention.

FIG. 8 illustrates a schematic block diagram of the embodiment of the facsimile receiver of the present invention. FIG. 9 is a waveform prepared for explaining the receiving operation. In FIG. 8, the signal 200 received through the transmission line passes through the receiving filter 50, where noise and channel disturbances (outband signals) are eliminated, and becomes signal 201. It is then amplified to a prescribed level at the receiver amplifying circuit 51 and signal 202 is obtained. The signal 202 is applied to the product circuit 52 and at the same time to the reference carrier wave producing circuit 53. The reference carrier wave producing circuit 53 produces a reference carrier wave 203 which is phase adjusted so that it may synchronize with either the 0 phase side or the $\pi$ phase side of the signal 202. This is then applied to the product circuit 52. The product circuit 52 conducts multiplication and demodulation of the signal 202 and the reference carrier wave 203, and produces the signal indicated as 204 in FIG. 9. Further, from the signal 204, the high frequency component is eliminated through the base band filter 54 and by its envelope demodulated baseband signal 205 is obtained.

The baseband signal 205 obtains full wave rectified wave 206 through the full wave rectifying circuit 55. With respect to the full wave rectifying wave 206, the dotted lines a and b indicated in the signal 206 waveform of FIG. 9 are identified as respective reference levels by the level comparators 56 and 57, obtaining with/without identifying signal 207A and double level identifying signal 207B respectively. Further, the above mentioned baseband signal 205 is identified by the level comparator 58, as zero level, that is, the dotted line C indicated in the signal 205 waveform of FIG. 9, as reference level and the polarity identification signal 207C is gained. By the timing signal 208A and 208B from the clock circuit 60, the control circuit 59 sequentially identifies whether the above mentioned identifying signals 207A, 207B, and 207C from the AM-PM-VSB demodulation circuit 49 are byte signals or picture element information signals at the edge of the byte timing section.

As described above, the byte signal from the transmitter takes the waveform of double level of the normal polarity that lasts during the byte timing unit length but on the receiver side errors are generated affected by various disturbances during transmission. Therefore, at the time of the receiver's identification operation, integral detection for each byte timing unit length is indispensable.

This integral detection function is, of course, incorporated in the control circuit 59 in FIG. 8. This is briefly explained below. At the changing point of the byte timing 208B and the polarity identification signal 207C, counters preset at a given value are independently prepared for each of the positive polarity and the negative polarity. The numbers of bits of the double level on the positive polarity side and those of the double level on the negative polarity side for each of the byte timing unit lengths (a), (b), (c), (d), (e), (g), (h) shown in the signal 208A waveform of FIG. 9 are individually counted. In counting the numbers, whether the counted numbers (integral value) exceeded the predetermined threshold or not, the byte signal, which matches the numbers counted on the side that exceeded the threshold, is regarded to have been detected. If the counted numbers on neither side exceeded the threshold, the byte signal is, of course, non-existent, and it is considered to be a component of the picture element information signal.

The above function can of course be arranged with hardware designed to function as explained above. But obviously it can also be readily arranged if a circuit incorporating a microprocessor with the prescribed basic function is used as the control circuit 59, providing with the above mentioned integral detection as well as the control function, to be explained later, as a firm ware. As to the sectioning of the byte timing 208B during the receiving operation, this is given by the initially established signal 209 from the control circuit 59 to the clock circuit 60 at the zero point of the line synchronizing signal as will be explained later. The signal 209 is also used in order to initially establish the block number counter 62 to the first block.

While conducting identification of the byte signal as explained above, and, simultaneously, following the condition of the with/without identifying signal 207A, the control circuit 59 through the signal line 210 writes in picture element information signal to the shift register 61 bit by bit. The shift register 61 has a capacity of 1 block or 16 bits and is written in by the shift pulse signal 211. When the writing-in of 16 bits is completed, and when it is identified to be significant picture element information signal, the output 213 of the shift register 61 is transferred to the register 63 by the sampling pulse 215 from the control circuit 59. The output 217 of the register 63 is withheld until completion of the writing-in of new significant picture element information signal to the shift register 61. Theofore, during that period the signal 217 is provided to the printout head 66 via the head driver 65 by the head drive command signal 216 from the control circuit 59. The sampling pulse 215 transfers the output 214 from the block number counter 62 to the register 64. The printout head 66 is divided into 108 blocks. When the block designated by the block designation signal 218 from the register 64 is energized by the series drive current 219 from the head driver 65, the block simultaneous printout is performed.

On the other hand, when the setting of the register 63 and 64 has been completed by the sampling pulse 215, the block number counter 62 is advanced forward by 1, by the signal 212 from the control circuit 59, and printing of the next block is prepared. Subsequently, in a situation, where the skipping flag has been received, the head drive command signal 216 from the control circuit 59 stands mute. In this condition, the block number counter 62 is made to advance forward by 1, by the signal 212 from the control circuit 59. In this manner, the contents of the block number counter 62, beginning with the number 1 block, are made to proceed 1 block by 1 block and as they proceed, the block with black prints out 16 bits simultaneously. The block without black does not print but processes until number 108 block. By doing so, 1 line of receiver printing is performed. The signal 212 is an increment signal for the block number counter 62 and is at the same time used as the preset signal for the block timing signal 208C of the clock circuit 60.

In the examples of waveforms indicated in FIG. 9, the threshold "3" is set for the counting function for identification of the aforementioned byte signal. The above explanation has clarified a series of signals from 202 through 207C of the waveform diagrams in FIG. 9. The dot and dash line drawn in the waveform of the signal 206 indicates zero level.

For the conditions identified and classified on bit unit basis by the signals 207A, 207B, and 207C, and let $P_2$ represent the positive polarity double level, $P_1$ represent the positive polarity ordinary level, Z represent zero level, $M_2$ represent the negative polarity double level, and $M_2$ the negative polarity with double level. Then the relationship between these identified conditions and the signal 207 is as shown in FIG. 10.

The first 4 bits (a) indicated in the waveform of the signal 208A in FIG. 9 being ($P_2P_2P_2P_2$) (see FIG. 9 (207A, 207B, 207C) and FIG. 10)., the positive polarity counting is "4", and is identified to be the positive polarity byte signal and supposing that the immediately preceding is not the byte signal of positive polarity, then it is assumed to be a skipping flag, and the head drive command signal 216 is not issued, instead the block number increment signal 212 is issued and the first block is not printed. The next 4 bits (b) being ($M_2M_2M_2M_2$), negative polarity counting becomes "3", which is identified to be negative polarity byte signal. Further, being preceded by (a), a positive polarity byte signal, this is also regarded as a jump signal and the second block is not printed and the process goes to the third block. (c) being ($M_1M_1M_1Z$), is not identified to be a byte signal, but is regarded as 4 bit at the outset of the picture element information signal. Then the process goes to (d), (d) being (Z Z Z Z) is not a byte signal. The (e) being ($P_1P_1P_1Z$) is not a byte signal. The (f) being (Z $M_1M_1M_1$) is not a byte signal.

Through process of the above (c), (d), (e), (f), the 16 bit picture element information signal is stored into the shift register 61 assuming the pattern "1110000011100111". As soon as storage of the above final 16th bit has been completed, the sampling pulse 215 is provided and the contents of the shift register 61 are transferred to the register 63, and those of the block number counter 62 to the register 64. Then the head drive command signal 216 is provided during the prescribed period ($\tau$), and printing is performed on the third block with "1" matching with the white picture element and "0" matching with the black picture element.

The subsequent four bit (g) being ($M_2M_2M_2M_2$), the negative polarity counting becomes 4. This is identified to be a byte signal. In addition, the (f) immediately preceding, being not a byte signal, is regarded to be a skipping flag. The fourth block, therefore, does not printout and the process goes to the fifth block. The (h) being ($M_1M_1Z$) is not a byte signal. So, it is stored into the shift register 61 merely as the initial 4 bit picture element information signal of the fifth block. The process then goes to identification of the next 4 bits. These are followed by similar operations and one line of receiver printout operation is performed.

Thus, a description of operation relating to transmitting and receiving processes of document/picture signals has been made. In actual operation of hardware, it is essential to add the line synchronizing signal which indicate the start of a scanning line. How this line synchronizing signal is regulated dtermines success of the performance of this system. In general, it is desirable that the line synchronizing signal has a high self-recovering synchronizing capability. That is, it should be capable of recovering a synchronizing condition upon receipt of a new and correct line synchronizing signal, when synchronization has been lost due to error, whatever the condition of the error is. For this purpose, it will be appropriate if appearance of the pattern which is same as that constituting the line synchronizing signal can be prevented in the document/picture signals. Because of the foregoing, the pattern illustrated in FIG. 11 can be used as an example of the line synchronizing signal in the embodiment of the present invention.

Figure 11:
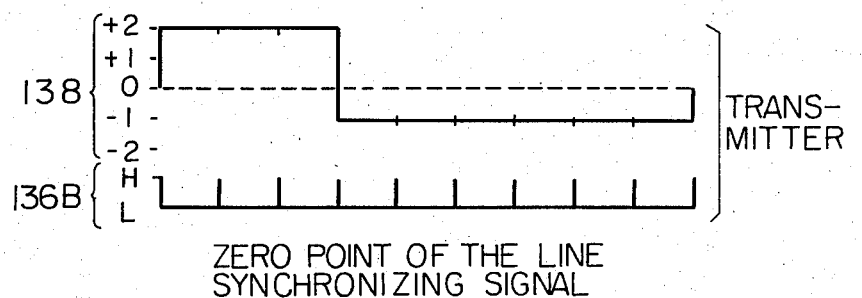
FIG. 11 illustrates waveform examples of the line synchronizing signals in the first embodiment of the present invention.

The signal 138 waveform in FIG. 11 is an output signal waveform of the polarity inverting circuit 36 in FIG. 6. It is prepared in advance in the control circuit 33 and is the original waveform of the line synchronizing signal to be transmitted at the start of a new line. As is obvious from FIG. 11, this line synchronizing signal is composed of the positive polarity double level signal that lasts 3 byte timing period and the subsequent negative polarity normal level signal that lasts 6 byte timing period. Of course, the patterns with the polarity of the waveform indicated in FIG. 11 all inverted can also be used as a line synchronizing signal. On the receiver side, when the same polarity byte signal has been received twice or more continuously using the aforementioned byte signal identifying algorithm, this is identified to be the start of the line synchronizing signal followed by generation of the initial polarity changing point. This point as the zero point, the initially prepared signal 209 is transmitted from the control circuit 59 to the clock circuit 60. Because of this, the bit timing 208A is so controlled that it is generated in approximately the middle, relative to the bit section of the receiver base band signal. At the same time, although the byte timing 208B is in the prior condition, it is established so that the byte signal identification sectioned into 4 bits each can be newly formed. Among the line synchronizing signals, the signals for the latter 6 bytes are used as reference amplitude for the purpose of adjusting gains when the automatic gain adjustment amplifying circuit is used in the receiver amplifying circuit 51 of the receiver.

Thus, the line synchronizing signals can be identified by continuity of the normal polarity byte signals, and therefore, can be clearly distinguished from the continuous skipping flags generated alternately from the byte signals of different polarities. At the same time, probability of the single skipping flags and picture element information signals, etc. being erroneously identified as the line synchronizing signal, is extremely small. Conversely, in as much as the line synchronizing signal itself remains undisturbed, it will remain traceable. Thus, the self-recoving capability of synchronization is superb.

The foregoing is a description of the first embodiment. The following is a brief description of the second embodiment which makes a more efficient transmission of document/picture possible through combination of the aforementioned byte signals.

As in the case of the first embodiment, all the picture elements in a line are grouped into blocks of a prescribed number of picture elements. With respect to the blocks without black element, skipping flags, the numbers of consecutive skipping blocks are coded to match with the code composition of the byte signal illustrated in FIG. 12, for example. The example illustrated in FIG. 12 is an example of the byte signal code composition created by grouping the 1088 picture elements constituting one line into 34 blocks of 32 picture elements each. With respect to the block with black, the black picture elements of the 32 picture elements are made to match with "0" and white picture element to "1". Thus, 32 bits are transmitted as picture element information signals. With respect to the skipping flags as already observed in the first embodiment, transmission is conducted on the bases of 4 bits as one unit or one byte timing.

The letters I and R in FIG. 12 indicate polarity of the double level byte signals. The $B_1B_2B_3B_5$ and $B_5$ in the code composition indicate the order of transmission, starting with the $B_1$ and ending with $B_5$. In FIG. 12, it should be noted that the number of the continuous same polarity is equal to or less than two (R and R and/or I and I). And it is also appreciated that the second embodiment is very efficient since the number of the continuous skipping blocks is coded. For instance, when the skipping blocks continue by four blocks, the skipping blocks in the first embodiment would be "I R I R" which has four bytes. On the contrary, the second embodiment transmits only two bytes "I R".

Figure 13:
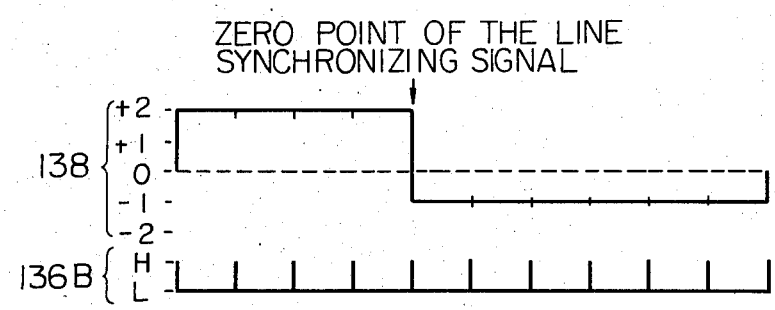
FIG. 13 illustrates a waveform example of the line synchronizing signals in the second embodiment of the present invention.

In this second embodiment, the pattern illustrated in FIG. 13 can be used as an example of the line synchronizing signal. It is a waveform composed of the positive polarity of double level signal comprising 4 consecutive bytes and of the negative polarity normal level signals comprising 6 consecutive bytes. It is of course understood that the waveform with polarity completely inverse to that shown in FIG. 13 is also used as the line synchronizing signal. The byte signal in a given line with the polarity same as that of the initial 4 byte component of the line synchronizing signal is called I and the byte signal with inverse polarity is called R. The code indicated in FIG. 12 is so arranged that the same polarity will not continue for 3 consecutive bytes. Therefore, the self-recovering synchronizing capability of the line synchronizing signals is secured, provided that an algorithm that enables the receiver to identify the start of the line synchronizing signal has been prepared when the same polarity byte signal has been observed to have continued 3 or more bytes uninterruptedly. The second embodiment such as described above can be readily put into practice by the use of hardware as follows:

Through arrangement of microprocessors to organize the control circuits 33 and 59 as depicted in the schematic block diagram in FIG. 6 of the transmitter and the schematic block diagram FIG. 8 of the receiver designed for the first embodiment, adding a firm ware for attaining its algorithm as well as memories etc. for a short-period storage of the byte signal polarity contained in the line synchronizing signal, will implement the second embodiment.

As explained above, algorithm for the transmitter and receiver in the second embodiment becomes slightly complex. However, additional hardware is scarcely needed and yet a far more efficient document/picture transmission becomes possible, responding extremely efficiently to continuous skipping blocks.

In the above description, 4 bit sections were used as byte timing which determines the unit length of byte signals. However, the unit length can be of any length. With respect to the block timing, although description of the embodiment was made on 16 bits and 32 bits, it is desirable, that this be appropriately determined by the statistical volume data on the documents/pictures transmitted, or by effective planning for improvement of printout efficiency.

Also, with respect to the line synchronizing signals, description was made using the time length of 3 bytes and 4 bytes as double level playing the role of the first half. These can of course be made longer, or on the contrary 2.5 bytes and 3.5 bytes are even possible. Furthermore, if algorithm is slightly revised, these time lengths can be even shortened to 1.5 bytes and 2.5 bytes respectively. For the latter half of the line synchronizing signals, the time length can be altered to an appropriate length and double level can be partly introduced, depending on the performance capacity of the receiver amplifying circuit 51. Where identification of the byte signal was concerned, description was made using "3" for the counting threshold. But this value is subject to change depending on the numbers of bits constituting the byte signal. Rather, the most appropriate value must be established in order to best treat transmission errors.

Also in the second embodiment, the code used for byte signals can be Huffman code or any other code system instead of the one in FIG. 12.

As described above, although the prior AM-PM-VSB modulation system is a modulation-demodulation technology that essentially makes highly efficient document/picture transmission (which can effectively utilize transmission channel frequency bandwidth), it is only with the present invention that makes improvement of efficiency possible through SWS redundancy processing through introduction of byte signal processing and by providing integral processing function. Further, by having the code composition of byte signals match with the numbers of consecutive skipping blocks, a far greater effectiveness can be gained.

From the foregoing it will now be apparent that a new and improved facsimile system has been found. It should be understood of course that the embodiments disclosed are merely illustrative and are not intended to limit the scope of the invention. Reference should be made to the appended claims, therefore, rather than the specification as indicating the scope of the invention.

Finally, the major reference numerals referred to in the specification are listed below.

1 . . . shift register
2 . . . flipflop
3 . . . polarity inverting circuit
4 . . . flipflop
5 . . . adder circuit
6 . . . polarity inverting circuit
7 . . . carrier wave generating circuit
8 . . . amplitude modulation circuit
9 . . . circuits including the above 4, 5 and 6
20 . . . picture signal memory
21 . . . identification circuit
22 . . . flag memory
23 . . . control circuit
24 . . . modulation circuit
30 . . . picture signal memory
31 . . . identification circuit
32 . . . flag memory
33 . . . control circuit
34 . . . clock circuit
35 . . . product circuit
36 . . . polarity inverting circuit
37 . . . baseband filter
38 . . . amplitude modulation circuit
39 . . . VSB circuit
40 . . . AM-PM-VSB modulation circuit
49 . . . AM-PM-VSB modulation circuit
50 . . . receiver filter
51 . . . receiver amplifying circuit
52 . . . product circuit
53 . . . reference carrier wave producing circuit
54 . . . baseband filter
55 . . . full wave rectifier circuit
56 . . . level comparator circuit
57 . . . level comparator circuit
58 . . . level comparator circuit
59 . . . control circuit
60 . . . clock circuit
61 . . . shift register
62 . . . block number counter
63 . . . register
64 . . . register
65 . . . head-driver
66 . . . printout head

What is claimed is:

1. A method for transmitting and receiving a picture information with high efficiency comprising the steps of, in a transmission station, storing a picture information obtained through a scanning operation in a picture signal memory, dividing each scanning line into a plurality of blocks each of which has m number of picture cells, identifying if each of block has a black cell or not and giving the binary zero flag to a block with a black cell and the binary one flag to a block with no black cell, storing the flags thus identified in a flag memory, providing a base band signal with positive and negative first amplitude levels and the zero level corresponding to each picture cell for the block to those blocks with a black cell, providing another base band signal as a skipping flag with positive and negative second amplitude levels to those blocks with no black cell said second amplitude levels being twice said first amplitude levels, said skipping flag having the duration of n number of picture cells where n is smaller than said m, providing a line synchronization signal with the positive and negative second amplitude levels, the composition of the line synchronization signal being different from that of said skipping flag, and modulating said base band signals and the line synchronization signal to provide an AM-PM-VSB modulated signal, and transmitting the AM-PM-VSB modulated signal to a communication line, and in a reception station, demodulating the AM-PM-VSB signal received from the communication line to provide a base band signal, differentiating a skipping flag from a picture signal when the level of the demodulated signal is higher than a second amplitude level threshold, and the high level continues longer than the predetermined duration, and printing only those blocks with black cell on a printing paper.

2. A facsimile transmission system comprising a picture signal memory for storing the picture information obtained through the scanning operation of a picture and for dividing each scanning line of picture information into a plurality of blocks each of which has m number of picture cells, an identification circuit for identifying if each block in a scanning line has a black cell or not and providing a flag to each block depending upon the presence of a black cell in a block, a flag memory for storing the flags thus obtained, means for providing a base band signal with positive and negative first amplitude levels and the zero level corresponding to each picture cell in the block to those blocks with a black cell, means for providing another base band signal as a skipping flag with positive and negative second amplitude levels to those blocks with no black cell, the second amplitude level being twice the first amplitude level the skipping flag having the duration of n number of picture cells where n is smaller than said m, means for providing a line synchronization signal with the positive and negative second amplitude levels, the composition of the line synchronization signal being different from that of the skipping flag, and means for modulating said base band signals and the line synchronization signal to obtain an AM-PM-VSB signal to be transmitted to a communication line.

3. The invention as defined in the claim 2, wherein when there are more than two continuous skipping flags, the phase of the first skipping flag is the opposite of the phase of the second skipping flag.

4. The invention as defined in the claim 2, wherein the line synchronization signal has the duration longer than a skipping flag, the phase of said line synchronization signal does not change in said duration, and the rear end of the line synchronization signal is utilized as a reference point of the line synchronization.

5. The invention as defined in the claim 2, wherein when there are more than two continuous skipping flags the number of the skipping flags is encoded in a binary form with zero phase signal and $\pi$ phase signal, each of those signals having a second amplitude level and the duration of n number of cells.

6. The invention as defined in the claim 2, wherein each scanning line has 1728 picture cells, and is divided into 108 blocks.

* * * * *